United States Patent Office 3,539,706
Patented Nov. 10, 1970

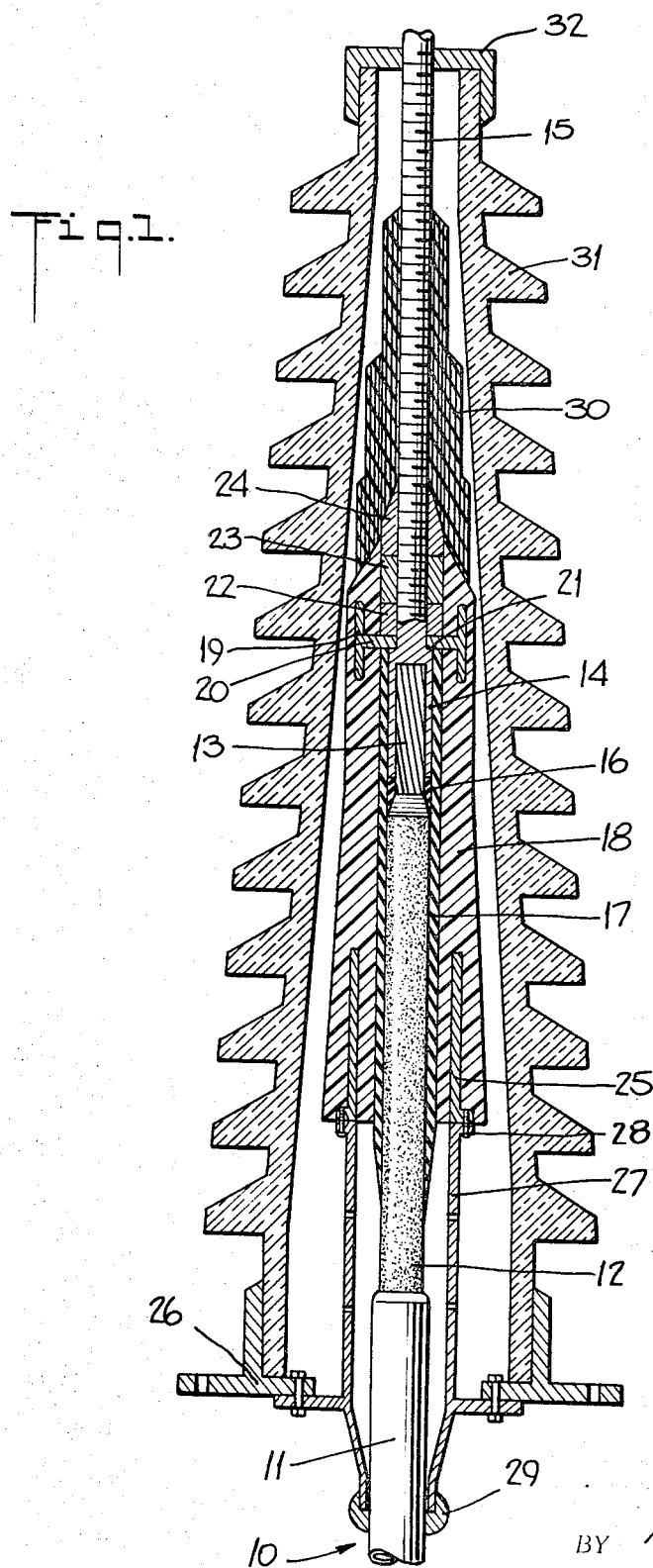

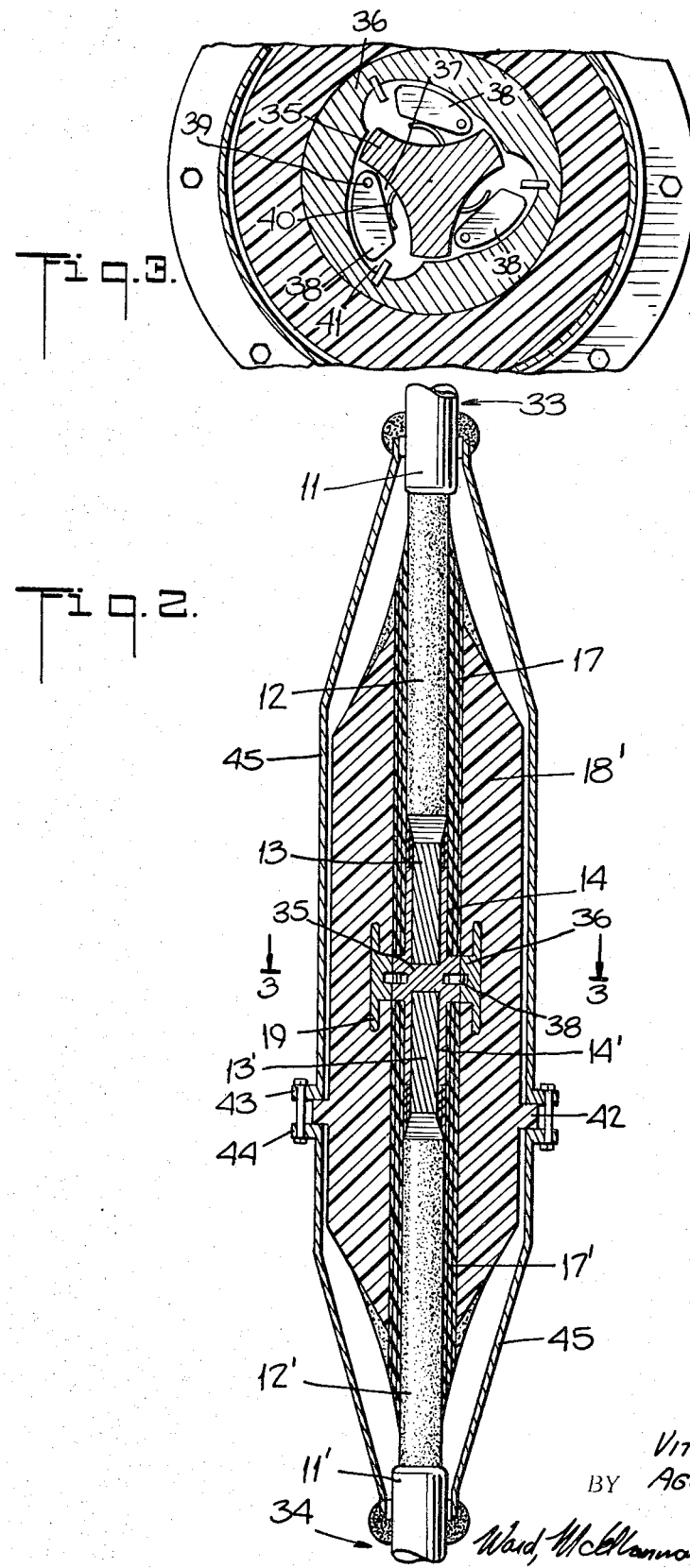

3,539,706
THERMAL EXPANSION RESISTANT CABLE
ACCESSORY INSTALLATION FOR HEAVY
CURRENT ELECTRIC CABLES
Vittorio Buroni, Milan, and Agostino Oriani, Sesto San Giovanni, Italy, assignors to Pirelli Societa per Azioni, Milan, Italy, a corporation of Italy
Filed June 28, 1968, Ser. No. 741,090
Claims priority, application Italy, Aug. 2, 1967, 19,120/67
Int. Cl. H02g 15/02, 15/08
U.S. Cl. 174—75
1 Claim

ABSTRACT OF THE DISCLOSURE

Accessory for heavy current electric cables wherein axial forces generated in the cable conductor by reason of thermal expansion, are absorbed by the support structure of the cable accessory. To this end, clamp means are secured to the tip of the cable conductor; and sleeve means are provided to surround the clamp means and are constructed of mechanically resistant material. Means, connected to the sleeve means and the clamp means, are provided to form a rigid connection therebetween, and support means are connected to the electric cable for supporting the cable accessory, the sleeve means being rigidly connected to the support means.

---

The present invention relates to accessories for electric cables, and in particular, to accessories for electric cables transmitting heavy currents.

The terms "accessory" and "accessories" are used in this specification to mean those devices of an electric circuit which are commonly known as "joints" and "sealing ends."

The conductor of an electric cable carrying electric current can become heated up to a temperature which, in relation to the rated current, is equal to that allowed for the considered type of cable, for instance 85° C. Consequently, the electric cable tends to elongate as a result of its thermal expansion, and it has been found that a part of the resultant cable elongation tends to concentrate in localized points of the electric cable, such as in the joints and the sealing ends thereof. Such elongation can be of the order of some centimeters and, if opposed, it can give rise to considerable forces. It is well known that the creation of these forces is proportional to the coefficient of linear expansion of the material constituting the conductor, the thermal variation, the cross sectional area of the conductor and the modulus of elasticity of the same. For instance, it has been observed that an electric cable provided with a copper strand conductor having a cross sectional area of about 1900 mm.² and carrying such a current as to raise the temperature of the strand conductor up to 85° C., can exert a thrust or axial force in the order of 8–10 tons.

This noted thrust, when localized in the joint of an electric cable, is exerted on the next adjacent cable length, thus giving rise to movements of the two cable lengths with respect to the ambient where the joint is installed. In the case of a sealing end of an electric cable, this noted thrust is exerted on the porcelain insulator which supports the cable connecting element, thus subjecting the porcelain insulator to strong tensile stresses. If the stresses which take place as a result of the exerted thrusts exceed certain limits, they can not be tolerated.

A proposed solution to this problem is that of connecting the cable conductor to a clamp free to slide longitudinally with respect to the support structure of the cable accessory, thus preventing in this way the occurrence of stresses. It is, however, necessary to consider that the outer portion of the electric cable, and specifically its metal sheath, is usually rigidly connected to this support structure. Under this condition and after a few cycles of thermal expansion and contraction, the resultant relative movement between the cable conductor and the cable sheath can cause disarrangement of cable insulation in the portion concerned.

In accordance with the present invention, the thrust or axial force generated in the cable conductor is absorbed by the structure supporting the cable accessory, without affecting either the porcelain insulator, in the case of sealing ends, or the adjacent cable length, in the case of cable joints. To this end, a clamp is provided to secure the end of the cable conductor; the clamp is rigidly connected by means of a metallic element to a sleeve of insulating material which surrounds the clamp. The sleeve in turn is rigidly connected to the structure supporting the cable accessory. This described second connection may be carried out directly or by means of an appropriate metallic insert. In the case of cable joints, there are two clamps which are coaxial and integrally connected.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception upon which this disclosure is based may readily be utilized as a basis for the designing of other structures for carrying out the several purposes of the invention. It is important, therefore, that the claims be regarded as including such equivalent constructions as do not depart from the spirit and scope of the invention.

Specific embodiments of the invention have been chosen for purposes of illustration and description, and are shown in the accompanying drawings forming a part of the specification wherein:

FIG. 1 is an axial sectional view of a sealing end for heavy current cables in accordance with the present invention;

FIG. 2 is an axial sectional view of a joint between two cable lengths in accordance with the present invention; and FIG. 3 is a fragmentary cross-sectional view taken along line 3—3 of FIG. 2.

Referring now to the drawings in detail, and specifically to FIG. 1, there is shown a terminal portion of an electric cable 10. This terminal portion comprises a lead outer sheath 11, an insulating layer 12 of impregnated paper and a conductor 13.

The end of the conductor 13 is fastened in a known manner, for instance by squeezing or welding, to a clamp 14 constituting the end of an outlet conductor 15.

The portion of bared cable conductor 13 between the insulating layer 12 and the end of the clamp 14 is protected by a short winding 16 of impregnated paper; and both the clamp 14 and a certain laterally adjacent length of the insulating layer 12 of the electric cable are further covered with another insulating layer 17, preferably constituted by impregnated paper.

A sleeve 18 of insulating material, for example epoxy resin loaded with quartz, is applied over the insulating layer 17. The sleeve 18 is thus constructed of a mechanically resistant insulating material. A metallic stress-control electrode 19 for the electric field is incorporated within the sleeve 18 and is provided with a ring 20 which extends inside the center opening of the sleeve 18 to rest on a shoulder 21 provided on the clamp 14 and facing to the outlet conductor 15. Bushings 22, 23, and 24, are screwed over the ring 20 as shown in FIG. 1. The last bushing 24 is externally conically shaped to eliminate damaging corners.

A tubular metallic insert 25 is also incorporated within the sleeve 18 and may also act as a stress-control electrode for the electric field. The tubular metallic insert 25 is secured to a support member or base plate 26 by suitable means providing a rigid connection therebetween. For example, this may comprise a perforated tubular element 27 as shown in FIG. 1. To this end, flanges may be provided on the adjoining sections of the tubular metallic insert 25 and the perforated tubular element 27. The flanges are joined together by suitable fastening means, such as screws 28. In addition, the perforated tubular element 27 is welded at a point 29, as shown in FIG. 1, to the metallic sheath 11 of the electric cable 10.

The portion of the outlet conductor 15 extending past both the sleeve 18 and bushing 24, and the bushing 24 itself are both insulated by means of windings 30 of impregnated paper. A porcelain insulator 31 is then applied on the thus formed unit and is retained in place by means of a ring nut 32. Thereafter, the porcelain insulator 31 may be covered with a conventional screening cap (not shown).

When there are no technical reasons for limiting the length of the sleeve 18, the clamp 14 can be disposed at the top of the sealing end in a zone screened by the cap, and in such case, the stress control electrode 19 is not necessary.

It will be appreciated from the foregoing description that the axial thrusts exerted by the cable conductor 13 on the clamp 14 are transmitted from the latter, through the ring 20, to the sleeve 18 and from there through the perforated tubular element 27, to the base plate 26 or to any other fixed part. Under this arrangement the axial thrusts exerted by the cable conductor 13 do not substantially affect the insulator of the sealing end and do not originate undue displacements of the conductor 13.

Referring to FIGS. 2 and 3, wherein the same reference numerals indicate like or equivalent structure as in FIG. 1, there is shown a cable joint for connecting two cable lengths 33 and 34, respectively. The ends of conductors 13 and 13' of the cable lengths 33 and 34, respectively, are fastened in two clamps 14, 14' supported by a connecting element 35 more fully described below. As shown in FIGS. 2 and 3, the connecting element 35 has an outer diameter slightly smaller than the inside diameter of a sleeve 18' which surrounds the two layers of insulation 17 and 17' of impregnated paper. The sleeve 18', which is similar in structure to the sleeve 18 of FIG. 1, incorporates a stress-control electrode 19 for the electric field and has an associated ring 36.

As shown in FIG. 3, three symmetrically disposed recesses 37 are provided in the connecting element 35, each housing a pawl 38. Each pawl 38 is constructed to be pivoted at 39 and to be biased radially outwardly of the cable joint by a spring 40. Also, three symmetrically disposed recesses 41 are provided in the ring 36 to receive the three pawls 38 in consequence of the action of the springs 39 when the recesses 41 are facing the recesses 37.

With the above described arrangement the sleeve 18' is applied about both the electric cable and the connecting element 35, and then is rotated clockwise (with reference to FIG. 3) until the recesses 37 and 41 face one another. When the sleeve and connecting element are in face to face position, the pawls 38 penetrate into the recesses 41 to stop the axial motion of the sleeve 18' with respect to the two joined cable lengths 33 and 34. Likewise, it is possible by rotation in opposite direction (i.e. counter clockwise) to disengage the sleeve 18'.

As shown in FIG. 2, the sleeve 18' is provided with a flange 42 which is clamped between the flanges 43 and 44 of an outer casing 45 secured to the metallic sheaths 11 and 11' of the joined electric cables. It will, of course be appreciated that the flange 42 or any other part projecting from the sleeve 18' can be directly fastened to any other fixed part.

It will additionally be appreciated that, in this case the resultant axial forces exerted by the conductors 13, 13' when it has a value other than zero, are transmitted through the pawls 38 which are appropriately sized for this purpose, through the sleeve 18' to the outer casing 45, and then to fixed structure.

Thus it may be seen from the above that in accodance with the present invention, the thrust or axial force generated in the conductor of an electric cable is absorbed by the supporting structure for the cable accessory without affecting either the porcelain insulator in the case of sealing ends or the adjacent cable length in the case of cable joints.

What is claimed as new and desired to be secured by Letters Patent is:

1. An accessory for heavy current electric cables comprising clamp means secured to the tip of the conductor of the electric cable, sleeve means surrounding said clamp means and constructed of mechanically rigid insulating material, metallic element means incorporated in said sleeve means and rigidly connected to said clamp means, and support means connected to said electric cable and supporting said accessory, said sleeve means being rigidly connected to said support means and said clamp means and said metallic element means having co-operating and interengaging notch and pawl means providing the rigid connection therebetween.

References Cited

UNITED STATES PATENTS

| 2,967,889 | 1/1961 | Priaroggia | 174—22 |
| 2,967,901 | 1/1961 | Priaroggia | 174—73 |
| 3,049,581 | 8/1962 | Palmieri | 174—73 |

FOREIGN PATENTS 955,202  4/1964  Great Britain.

LARAMIE E. ASKIN, Primary Examiner

U.S. Cl. X.R.

174—73, 88